US009172555B2

(12) United States Patent
Takada et al.

(10) Patent No.: US 9,172,555 B2
(45) Date of Patent: *Oct. 27, 2015

(54) DISTRIBUTION APPARATUS, COMMUNICATION SYSTEM AND COMMUNICATION METHOD

(75) Inventors: Hiroaki Takada, Nagoya (JP); Ryo Kurachi, Nagoya (JP); Yukihiro Miyashita, Yokkaichi (JP)

(73) Assignees: NATIONAL UNIVERSITY CORPORATION NAGOYA UNIVERSITY, Nagoya-shi (JP); AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 698 days.

This patent is subject to a terminal disclaimer.

(21) Appl. No.: 12/451,654

(22) PCT Filed: Aug. 22, 2008

(86) PCT No.: PCT/JP2008/064996
§ 371 (c)(1),
(2), (4) Date: Nov. 24, 2009

(87) PCT Pub. No.: WO2009/025351
PCT Pub. Date: Feb. 26, 2009

(65) Prior Publication Data
US 2010/0169278 A1      Jul. 1, 2010

(30) Foreign Application Priority Data

Aug. 22, 2007   (JP) .................. 2007-216392

(51) Int. Cl.
G06F 17/30  (2006.01)
H04L 12/40  (2006.01)

(52) U.S. Cl.
CPC . *H04L 12/40143* (2013.01); *H04L 2012/40273* (2013.01)

(58) Field of Classification Search
CPC combination set(s) only.
See application file for complete search history.

(56) References Cited

U.S. PATENT DOCUMENTS 6,118,724 A * 9/2000 Higginbottom .......... 365/230.05
6,128,560 A * 10/2000 Ishii ........................... 701/31.4
(Continued)

FOREIGN PATENT DOCUMENTS

EP    1 037 430 A1    9/2000
JP    A-2000-284808  10/2000
(Continued)

OTHER PUBLICATIONS

Irino et al.; "Minseiyo AVKiki o Mochiita MPEG2-TS over IP no Sekkei to Jisso;" *Information Processing Society of Japan*; Mar. 20, 2003; pp. 31-36, vol. 2003; No. 34.
(Continued)

*Primary Examiner* — Shyue Jiunn Hwa
(74) *Attorney, Agent, or Firm* — Oliff PLC

(57) ABSTRACT

Distribution apparatuses include databases for storing data received from ECUs, and further include receiving buffers and sending buffers. The distribution apparatus continuously performs, in parallel, an operation for storing received data on the receiving buffer, operation for synchronizing contents of the database with the databases, and an operation for sending data from the sending buffer. Further, the distribution apparatus periodically copies data of the receiving buffer onto the database and data of the database onto the sending buffer.

11 Claims, 13 Drawing Sheets

(56) References Cited

U.S. PATENT DOCUMENTS

| | | | |
|---|---|---|---|
| 6,360,152 B1 | 3/2002 | Ishibashi et al. | |
| 6,823,349 B1* | 11/2004 | Taylor et al. ........................... | 1/1 |
| 7,681,135 B2* | 3/2010 | Madhavarao et al. ........ | 715/744 |
| 8,631,160 B2* | 1/2014 | Joublin et al. ................ | 709/248 |
| 2002/0006139 A1* | 1/2002 | Kikkawa et al. .............. | 370/502 |
| 2004/0083043 A1* | 4/2004 | Akiyama et al. ................ | 701/48 |
| 2007/0101057 A1* | 5/2007 | Holt .............................. | 711/113 |
| 2007/0133578 A1* | 6/2007 | Tani .............................. | 370/401 |
| 2008/0040670 A1* | 2/2008 | Madhavarao et al. ........ | 715/733 |
| 2008/0126357 A1* | 5/2008 | Casanova et al. .............. | 707/10 |

FOREIGN PATENT DOCUMENTS

| | | |
|---|---|---|
| JP | A-2002-204249 | 7/2002 |
| JP | A-2005-159568 | 6/2005 |
| WO | WO 99/22494 | 5/1999 |
| WO | WO 2007/043608 A1 | 4/2007 |

OTHER PUBLICATIONS

International Search Report for International Application No. PCT/JP2008/064996, issued Sep. 16, 2008.

* cited by examiner

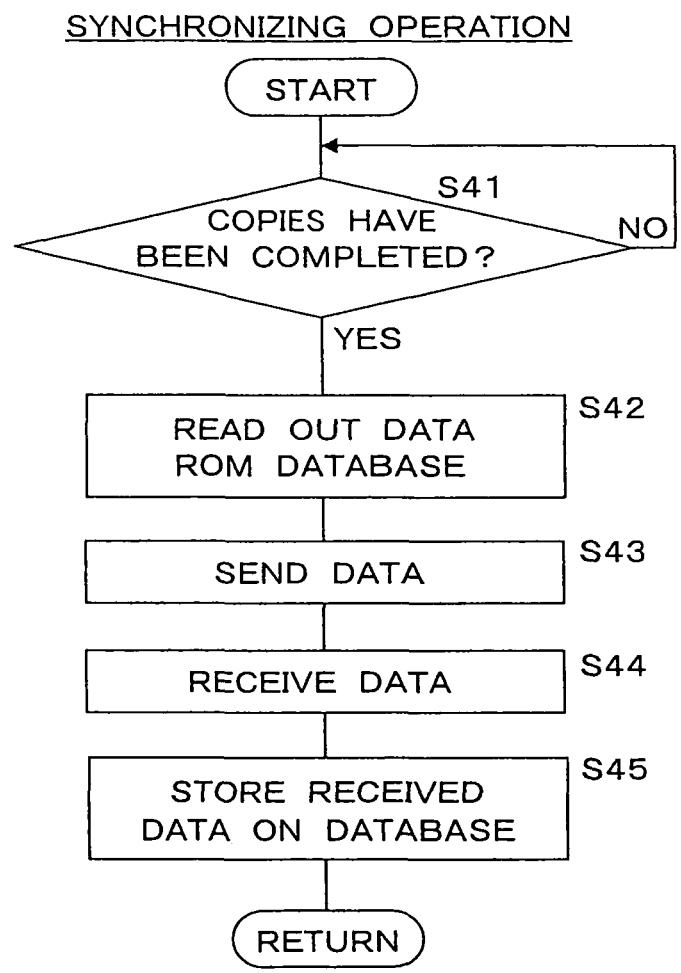

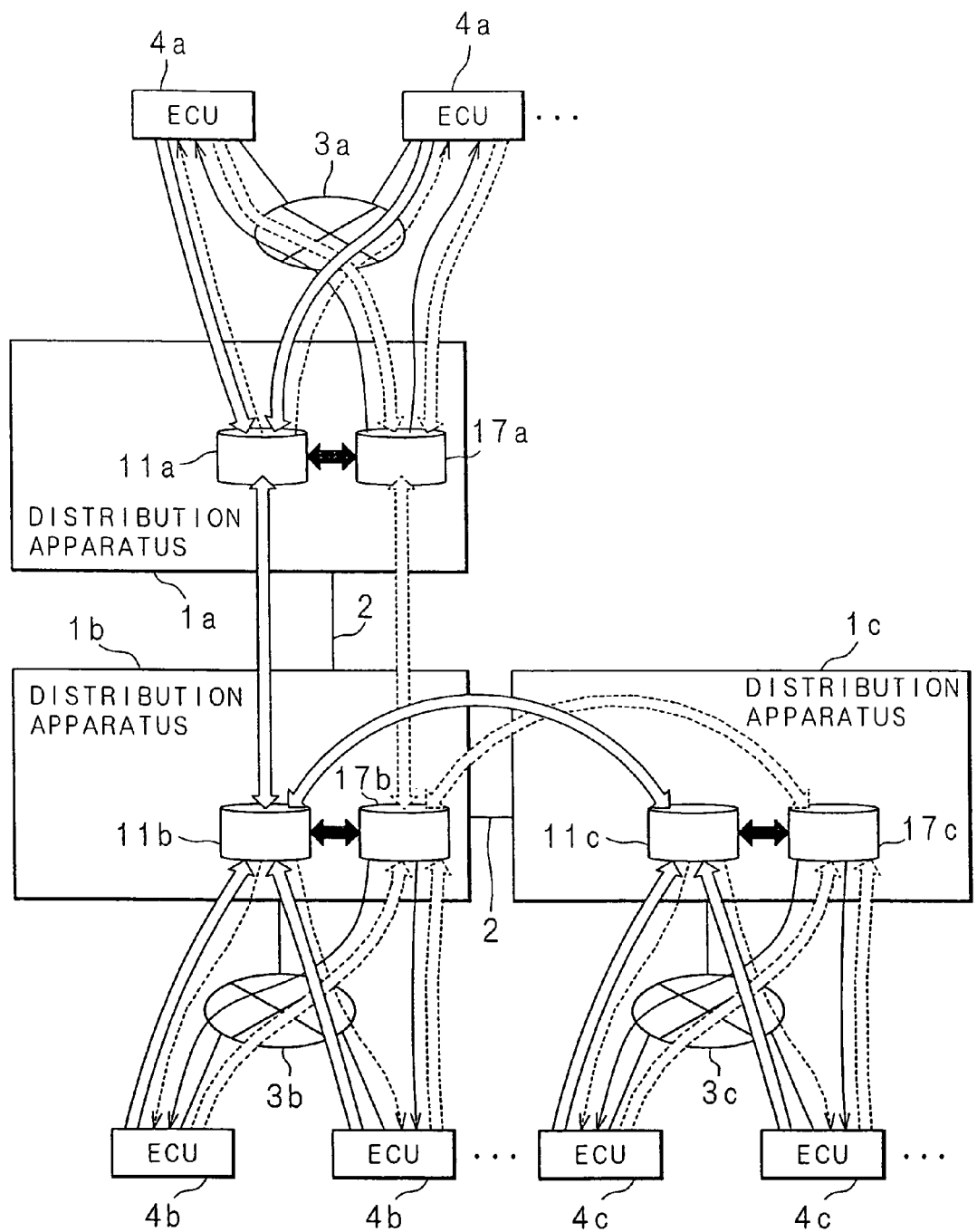

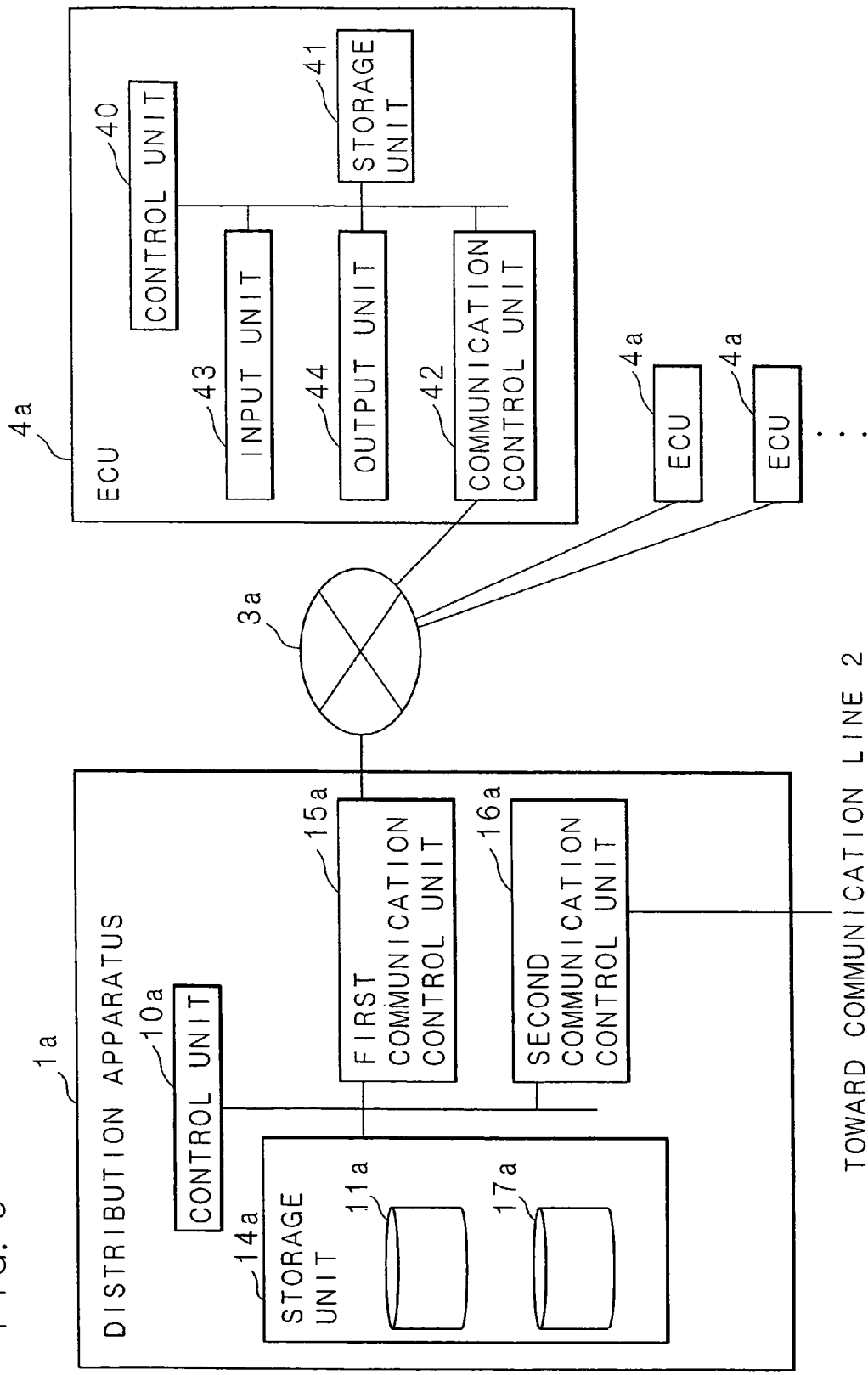

DISTRIBUTION APPARATUS, COMMUNICATION SYSTEM AND COMMUNICATION METHOD

This application is the national phase under 35 U.S.C.§371 of PCT International Application No. PCT/JP2008/064996 which has an International filing date of Aug. 22, 2008 and designated the United States of America.

BACKGROUND OF THE INVENTION

1. Field of the Invention

The present invention relates generally to a communication system including a plurality of distribution apparatuses each of which collects data from a plurality of communication apparatuses, distributes collected data to a communication apparatus and exchanges stored data to another distribution apparatus in order to synchronize contents of stored data, in particular to a distribution apparatus that is capable of reducing the delay of sending data collected from each communication apparatus to a communication apparatus due to the synchronization, a communication system including the distribution apparatus, and a communication method using the distribution apparatus.

2. Description of the Related Art

It is recently known in several fields to utilize a system having many communication apparatuses, in which each communication apparatus is provided a certain function and connected with other communication apparatuses in order to perform variable operations through data exchange between many communication apparatuses. For example, it is known in a field of local area network (LAN) adapting for car to utilize electronic control units (ECUs) as the communication apparatuses, to make each ECU perform a certain operation and to exchange data between the ECUs, in order to provide various functions to be implemented by a system.

A number and a type are increased of the communication apparatuses connected to a communication medium in a system, proportionally to a specializing degree of the function provided to each communication apparatus, as well as an increasing degree of the functions performed by the system. Furthermore, the system is expected to perform much more various functions. Thus, each communication apparatus is required to share data and to interact with other communication apparatuses. Then, it results in an increase of exchanged data amount.

To accommodate the increase of exchanged data amount, communication apparatuses of the system is generally divided into some groups, and then each group is connected to a communication medium. This configuration can reduce communication traffic volume because of reducing the number of communication apparatuses connected to the communication medium. Thus, this configuration can prevent data collision and the like. Furthermore, it is thought to focus on data type treated by the groups of communication apparatus, and then to connect each group to each of communication mediums respectively having different communication speed. In such a configuration, a group treating a predetermined data type is connected with another group treating another predetermined data type, by a gateway apparatus that controls data transmission.

Japanese Patent Application Laid-Open No. 2005-159568 discloses that: ECUs in a field of LAN adapting for car are divided into some groups; each group is connected to each of communication lines of car; the communication lines of car are connected to each other by a gateway apparatus; priority information is added to the received and sent data in order to recognize data priority; the data priority is recognized through the priority information and the data having high priority is preferentially sent when the gateway apparatus performs data transmission between different communication lines of car, to prevent a transmission delay of data having high priority even when the communication lines of car take increased duty for data transmission.

SUMMARY OF THE INVENTION

In a case that a plurality of communication apparatuses are divided into a plurality of groups and each group is connected with another group through a gateway apparatus, the gateway apparatus sends data from a communication apparatus to another communication apparatus every time when the communication apparatus sends the data toward this another communication apparatus. In such a case, it is difficult to reduce the duty for data transmission.

Then, it is thought to utilize a distribution apparatus that temporally stores data transmitted from each communication apparatus and distributes stored data to another communication apparatus. With using a plurality of such distribution apparatuses and with periodically synchronizing data between the distribution apparatuses, it is possible to send stored data from each distribution apparatus with efficient timing or with efficient combination, in order to reduce the duty for data transmission.

In such a case, it may stop data transmission between the distribution apparatus and the communication apparatuses during the synchronizing period for synchronizing contents of data stored in the distribution apparatuses, in order to prevent storing data. However, such configurations may cause the delay of data transmission from and to the communication apparatus, as time of delay correspond to the synchronizing period.

The present invention was made in view of such circumstances, and has a primary object to provide a communication system including a plurality of distribution apparatuses each of which temporally stores data from a plurality of communication apparatuses and implementing a reduction of delay about data sending to a communication apparatus due to the synchronization preformed between the distribution apparatuses in order to make communication apparatuses connected with different distribution apparatuses utilize same data, and to provide a communication method using the distribution apparatus.

Another object of the present invention is to provide a distribution apparatus that reduces delay of data transmission to a communication apparatus due to synchronization of data between distribution apparatuses, with providing a storing means for receiving data, a storing means for sending data, and a storing means for synchronizing data, and with performing a synchronizing operation and a data transmitting operation in parallel.

Another object of the present invention is to provide a distribution apparatus and a communication method that reduce delay of data sending to a communication apparatus due to synchronization of data between distribution apparatuses, with providing a storing means for receiving data, a storing means for sending data, and a storing means for synchronizing data, with periodically copying data stored on each storing means, and with performing a synchronizing operation utilizing the latest data and a data transmitting operation in parallel.

Another object of the present invention is to provide a distribution apparatus that can reduce delay of data sending to a communication apparatus due to synchronization of data between distribution apparatuses, with providing a storing means for storing data received from a communication apparatus, a storing means for storing data to be sent to a communication apparatus, and a storing means for storing data to synchronize between distribution apparatuses, with periodically changing the means, with performing a synchronizing operation that utilizes the latest data and a data transmitting operation in parallel, and with synchronizing data between distribution apparatuses.

A distribution apparatus according to a first aspect of the present invention has: a means for receiving data from a plurality of external units; a plurality of storing means for storing received data; a means for sending data stored on the storing means to another unit except for the external unit; a means for storing data received from the another unit on the storing means, and a means for distributing the data stored on the storing means to an external unit; and comprises: a means for storing data received from an external unit on a storing means; a means for reading out data that should be sent to an external unit from a storing means; a means for reading out data that should be sent to an unit except for the external unit from a storing means; and a means for storing data sent from the unit on a storing means, wherein an operation of each means is performed in parallel.

In a distribution apparatus according to a second aspect of the present invention, data received from an external unit is stored on a first storing means in the storing means; data that should be sent to an external unit is read out from a second storing means; data that should be sent to an unit except for the external unit is read out from a third storing means; and data being sent from the unit is stored on the third storing means.

A distribution apparatus according to a third aspect of the present invention comprises: a means for periodically copying data stored by the third storing means on the second storing means; a means for periodically copying data stored by the first storing means on the third storing means; a means for storing data received from an external unit on the first storing means, after copying; a means for sending data being read from the second storing means to an external unit, after copying; a means for sending data stored by the third storing means to the unit, after copying; and a means for storing data received from the unit on the third storing means, after copying, wherein a storing operation, reading operation and a transmitting operation of each means are performed in parallel.

A distribution apparatus according to a fourth aspect of the present invention comprises: a means for utilizing the storing means as the first storing means for storing data received from the external unit, the second storing means for reading out data that should be sent to an external unit, and as the third storing means for reading out data that should be sent to an unit except for the external unit and for storing data sent from the unit; and a means for periodically changing the storing means utilized as the first, second and third storing means.

A communication system according to a fifth aspect of the present invention includes a plurality of communication apparatuses that transmit data and a plurality of distribution apparatuses that have a means for receiving data from the communication apparatus, a plurality of storing means for storing received data, and a means for distributing data stored by the storing means to the communication apparatus, wherein each distribution apparatus sends data stored by the storing means to another distribution apparatus at a predetermined interval in order to receive data between the distribution apparatuses and synchronize data contents stored by each storing means, wherein the distribution apparatus comprises: a means for storing data received from a communication apparatus on the storing means; a means for reading out data that should be sent to a communication apparatus from the storing means; a means for reading out data that should be sent to another distribution apparatus from the storing means; and a means for storing data sent from another distribution apparatus on the storing means, wherein a storing operation, reading operation and a transmitting operation of each means are performed in parallel.

A communication method according to a sixth aspect of the present invention is for synchronizing data contents of each storing means of a communication system that is provided with a plurality of communication apparatus transmitting data and a plurality of distribution apparatuses having a means for receiving data from the communication apparatus, a plurality of storing means for storing received data, and a means for distributing data stored on the storing means to the communication apparatus, wherein each distribution apparatus sends data stored by the storing means to another distribution apparatus at a predetermined interval in order to receive data between the distribution apparatuses and synchronize data contents stored by each storing means, wherein the distribution apparatus performs operations of: storing data received from a communication apparatus on the storing means; reading out data that should be sent to a communication apparatus from a storing means; reading out data that should be sent to another distribution apparatus from a storing means; and storing data sent from another distribution apparatus on a storing means, wherein a storing operation, reading operation and a transmitting operation of each means are performed in parallel.

A communication method according to a seventh aspect of the present invention includes the distribution apparatus that utilizes: a first storing means among the storing means for storing data received from the communication apparatus; a second storing means for reading out data that should be sent to the communication apparatus; and a third storing means for synchronizing data contents stored on a storing means of another distribution apparatus; and includes the communication method that comprises the steps of copying data stored on the third storing means in the second storing means, periodically; copying data stored on the first storing means in the third storing means, periodically; storing data received from a communication apparatus on the first storing means; sending data being read out from the second storing means to a communication apparatus; sending data stored on the third storing means to another distribution apparatus; storing data received from another distribution apparatus on the third storing means to synchronize contents; and performing a storing operation, reading operation and a transmitting operation, in parallel.

In accordance with an aspect of the present invention, a plurality of storing means are provided for storing data sent from a communication apparatus that is an external apparatus. With using each storing means, three operations are performed in parallel: a storing operation for storing data received from a communication apparatus; sending operation for sending data being read out to a communication apparatus; and a synchronizing operation for synchronizing data with another distribution apparatus that is snot the, external apparatus.

In accordance with an aspect of the present invention, data received from a communication apparatus that is an external apparatus is stored on a first storing means that is among the storing means, data that should be sent to an external unit is read out from a second storing means, data is sent to and received from another distribution apparatus that is not the external apparatus, and received data from another distribution apparatus is stored on the third storing means.

In accordance with an aspect of the present invention, data that is stored on a third storing means and is synchronized at the latest period is copied on a second storing means for sending, before a synchronizing operation with another distribution apparatus is performed with using a third storing means for synchronizing. Data being stored on a first storing means for receiving that stores the latest data is copied on the third storing means for synchronizing. After the copying operation, three operations are performed in parallel: a storing operation for storing data newly received on the first storing means; operation for reading out data updated and stored on the second storing means and for sending such data, and a synchronizing operation for synchronizing contents of the third storing means that has the latest copied data. Further, these operations are periodically repeated.

In accordance with an aspect of the present invention, provided plural storing means are periodically changed to be a first storing means for receiving, second storing means for sending and a third storing means for synchronizing. Data stored on a storing means that is changed to be the third storing means for synchronizing is synchronized with data of another apparatus. Thus, synchronized data is sent to each communication apparatus, with changing the means being the third storing means to be the second storing means for sending at the next period. In addition, data stored on a storing means changed to be the first storing means for receiving is updated to be the latest data. Thus, the latest data is transmitted between this apparatus and another distribution apparatus and is synchronized, with changing the means being the first storing means to be the third storing means for synchronizing at the next period.

In accordance with an aspect of the present invention, it is possible to prevent data transmission from being held between a distribution apparatus and a communication apparatus during a synchronizing period and it is possible to reduce data sending delay.

In accordance with an aspect of the present invention, it is possible to perform a receiving operation, sending operation and a synchronizing operation in parallel, and it is possible to reduce data sending delay, because a plurality of storing means are utilized as a storing means for receiving, storing means for sending and a storing means for synchronizing.

In accordance with an aspect of the present invention, it is possible to periodically synchronize data on storing means between distribution apparatuses with using the latest data. Therefore, it is possible to make communication apparatuses connected to different distribution apparatus utilize the same latest data. Furthermore, it is possible to prevent data transmission between a distribution apparatus and a communication apparatus during synchronizing period from being held, and to reduce data sending delay, because a transmitting operation and a synchronizing operation are performed in parallel.

In accordance with an aspect of the present invention, it is possible to perform a synchronizing operation and a transmitting operation in parallel, with the simple configuration that change a storing means storing the received latest data without copying. Therefore, it is possible to reduce data sending delay due to a synchronizing operation of a distribution apparatus.

The above and further objects and features of the invention will more fully be apparent from the following detailed description with accompanying drawings.

BRIEF DESCRIPTION OF THE DRAWINGS

FIG. 6 is a flowchart showing a procedure for synchronizing contents of database with another distribution apparatus with using the control unit of the distribution apparatus of the embodiment 1;

FIG. 8 is a block diagram showing components of a communication system adapting for car of an embodiment 2;

FIG. 9 is a block diagram showing inner components of an ECU and a distribution apparatus included in the communication system adapting for car of the embodiment 2;

DESCRIPTION OF THE PREFERRED EMBODIMENTS

Hereinafter, an embodiment of the present invention is described in detail with reference to drawings. In following embodiments, a communication system according to the present invention is described in the context of a communication system adapting for car that utilizes a LAN adapting for car connected to a plurality of ECUs to send and receive data.

(Embodiment 1)

Figure 1:
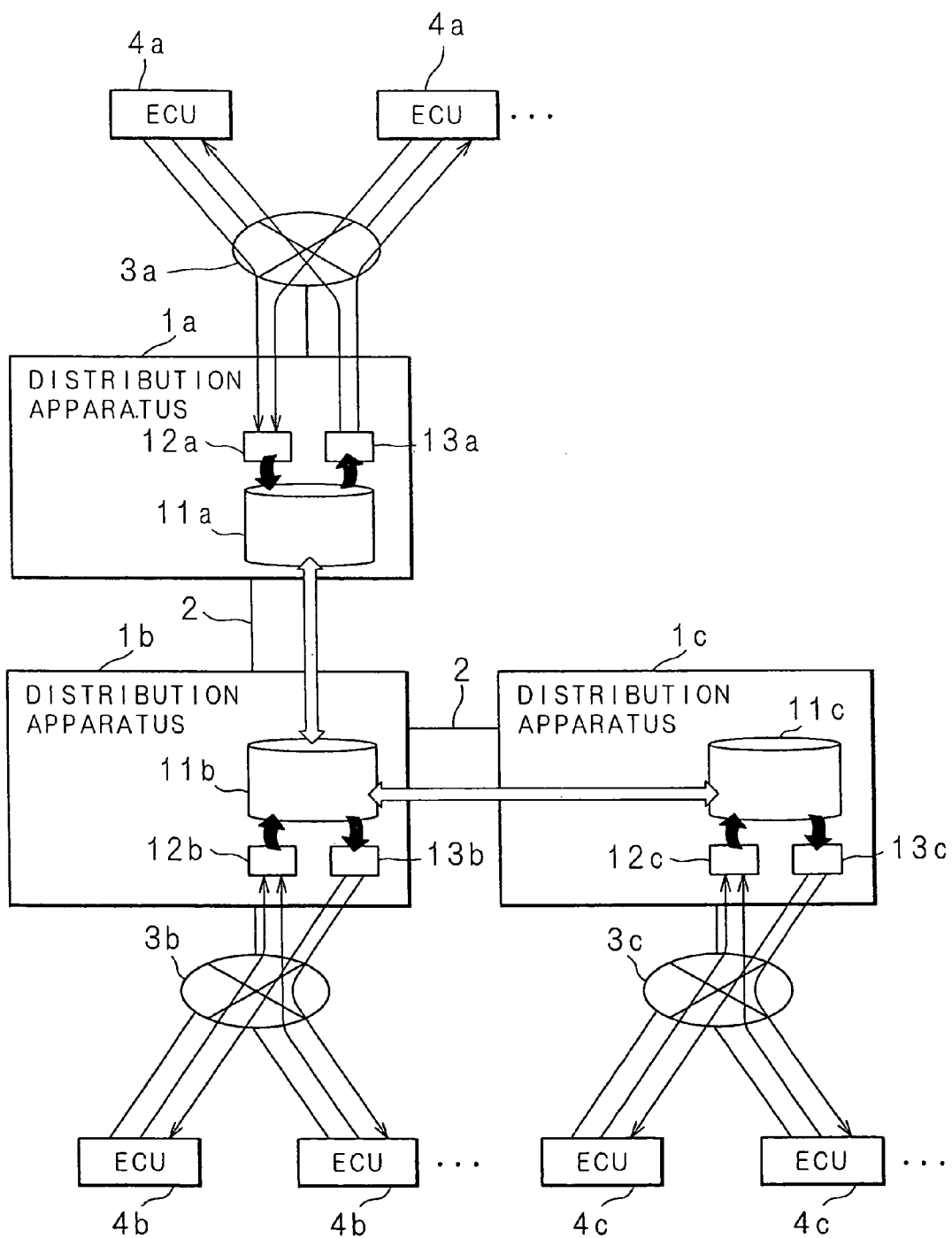
FIG. 1 is a block diagram showing components of a communication system adapting for car of an embodiment 1.

FIG. 1 is a block diagram showing components of a communication system adapting for car of an embodiment 1. The communication system adapting for car of the embodiment 1 includes: electronic control units (ECUs) $4a$, $4a$, ..., $4b$, $4b$, ..., $4c$, $4c$, ... that are divided in plural groups and respectively send and receive data; communication lines $3a$, $3b$, $3c$ that respectively connect with each of ECUs $4a$, $4a$, ..., $4b$, $4b$, ..., $4c$, $4c$, ... by each of the groups; distribution apparatuses $1a$, $1b$, $1c$ that are respectively connected to the communication lines $3a$, $3b$, $3c$ and distribute data to each of the ECUs $4a$, $4a$, ..., $4b$, $4b$, ..., $4c$, $4c$, ...; a communication line $2$ that connects between the distribution apparatuses $1a$, $1b$, $1c$. The communication system adapting for car of the embodiment 1 is configured to be a trunking type network, as the ECUs $4a$, $4a$, ..., $4b$, $4b$, ..., $4c$, $4c$, ... are divided into a plurality of groups through the distribution apparatus $1a$, $1b$, $1c$ connected to the communication line $2$ referred to as a trunk.

In the embodiment 1, daisy chain topology is adopted for the connection topology of the distribution apparatuses 1a, 1b, 1c via the communication line 2. Other connection topology may be adopted for the connection topology of the distribution apparatuses 1a, 1b, 1c via the communication line 2. A connection topology between the ECUs 4a, 4a, ..., 4b, 4b, ..., 4c, 4c, ... and the distribution apparatuses 1a, 1b, 1c via the communication lines 3a, 3b, 3c may be a bus topology, star topology, daisy chain topology, or the like.

The distribution apparatuses 1a, 1b, 1c include storage region that works as databases 11a, 11b, 11c, respectively. Basically, the distribution apparatuses 1a, 1b, 1c respectively collect data sent from the ECUs 4a, 4a, ..., 4b, 4b, ..., 4c, 4c, ... connected via the communication lines 3a, 3b, 3c, store the collected data on the databases 11a, 11b, 11c, read out stored data from the databases 11a, 11b, 11c, and send the read data to the ECUs 4a, 4a, ..., 4b, 4b, ..., 4c, 4c, ... in order to distribute the data when necessary.

The ECUs 4a, 4a, ..., 4b, 4b, ..., 4c, 4c, ... can send data including numerical information of several physical quantities, such as measured values, computed values and control values. Furthermore, the ECUs 4a, 4a, ..., 4b, 4b, ..., 4c, 4c, ... can associate with a microcomputer for an engine, brake or the like. For example, the ECU 4a is connected with a sensor (not shown) for detecting rotation speeds of wheels (wheel speed), and works as an antilock brake system (ABS). The ECU 4a controls the brake in accordance with the wheel speed detected through the sensor during braking time of the car, and sends data including measured values of the wheel speed to the distribution apparatus 1a.

The ECUs 4a, 4a, ..., 4b, 4b, ..., 4c, 4c, ... respectively send data based on each function described above to own connected distribution apparatuses 1a, 1b, 1c via the communication lines 3a, 3b, 3c. In other words, data that the distribution apparatuses 1a, 1b, 1c respectively receive from the ECUs 4a, 4a, ..., 4b, 4b, ..., 4c, 4c, ... and store on own databases 11a, 11b, 11c is data that is respectively sent from the ECUs 4a, 4a, ..., 4b, 4b, ..., 4c, 4c, ... connected with the distribution apparatuses 1a, 1b, 1c via the communication lines 3a, 3b, 3c. Thus, each of the distribution apparatuses 1a, 1b, 1c stores and updates a different type of data that is stored on own database 11a, 11b, 11c.

For example, wheel speed data sent from the ECU 4a is stored on the database 11a by the distribution apparatus 1a. The distribution apparatus 1a updates values corresponding to the wheel speed data every time of receiving the wheel speed data. In some cases, the ECUs 4b, 4b, ..., 4c, 4c ... may require the wheel speed data, even though the ECUs 4b, 4b, ..., 4c, 4c ... are connected to other communication lines 3b, 3c. In these cases, the distribution apparatus 1a sends the wheel speed data to the other distribution apparatuses 1b, 1c, each of the other distribution apparatuses 1b, 1c stores the received wheel speed data on own database 11b, 11c, and each of the other distribution apparatuses 1b, 1c sends the received wheel speed data to own connected ECUs 4b, 4b, ..., 4c, 4c ... that require the wheel speed data.

As described above, each of the distribution apparatuses 1a, 1b, 1c receives data sent from the ECUs 4a, 4a, ..., 4b, 4b, ..., 4c, 4c, ... and sends the received data, in order to synchronize contents of databases 11a, 11b, 11c, to the other distribution apparatuses 1a, 1b, 1c, too. Therefore, it is possible to allow the ECUs 4a, 4a, ..., 4b, 4b, ..., 4c, 4c connected to different communication lines 3a, 3b, 3c to utilize the same data.

The embodiment 1 is configured that data is sent to the ECUs 4a, 4a, ..., 4b, 4b, ..., 4c, 4c after being stored in the distribution apparatuses 1a, 1b, 1c. Thus, it is possible to optimize timing of data sending from the distribution apparatuses 1a, 1b, 1c to the ECUs 4a, 4a, ..., 4b, 4b, ..., 4c, 4c, ... in accordance with an operation status of each of the ECUs 4a, 4a, ..., 4b, 4b, ..., 4c, 4c. Further, it is possible to send data that is combined in accordance with an operation status of each of the ECUs 4a, 4a, ..., 4b, 4b, ..., 4c, 4c, ... or to send data that has been calculated as needed. Furthermore, it is possible to reduce duty for data transmission of the communication lines 3a, 3b, 3c, because of efficient data transmission from the distribution apparatuses 1a, 1b, 1c described above.

Each of the distribution apparatuses 1a, 1b, 1c performs: an operation of storing data being sent from each ECU 4a, 4a, ..., 4b, 4b, ..., 4c, 4c on the database 11a, 11b, 11c; an operation of sending data stored on the database 11a, 11b, 11c to each ECU 4a, 4a, ..., 4b, 4b, ..., 4c, 4c; and an operation of exchanging data in order to synchronize between the databases 11a, 11b, 11c of the distribution apparatuses 1a, 1b, 1c. However, each content of database 11a, 11b, 11c is happened to be changed by the sent new data from own connected ECUs 4a, 4a, ..., 4b, 4b, ..., 4c, 4c, ... in the case that the distribution apparatuses 1a, 1b, 1c are exchanging data stored on the databases 11a, 11b, 11c each other in order to synchronize and are sequentially storing the sent new data from own connected ECUs 4a, 4a, ..., 4b, 4b, ..., 4c, 4c on the synchronizing databases 11a, 11b, 11c.

Thus, it is thought that timing of operations performed by the distribution apparatuses 1a, 1b, 1c and the ECUs 4a, 4a, ..., 4b, 4b, ..., 4c, 4c are divided in order to surely make time for synchronizing contents of databases 11a, 11b, 11c. For example, it is thought that the performed operation timings are divided into a synchronizing period when a synchronizing operation is performed between the distribution apparatuses 1a, 1b, 1c and a data transmission period when a data transmitting operation is performed between each of the distribution apparatuses 1a, 1b, 1c and the ECUs 4a, 4a, ..., 4b, 4b, ..., 4c, 4c corresponding to each of the distribution apparatuses 1a, 1b, 1c and that the synchronizing period and the data transmission period are configured to be alternated periodically.

During the synchronizing period, each of the distribution apparatuses 1a, 1b, 1c performs: an operation of sending data stored on own database 11a, 11b, 11c to another distribution apparatus 1a, 1b, 1c; operation of receiving data sent from another distribution apparatus 1a, 1b, 1c; and an operation of storing the received data. The ECUs 4a, 4a, ..., 4b, 4b, ..., 4c, 4c are controlled to hold data sending operations to the distribution apparatuses 1a, 1b, 1c and controlled to perform another operation. On the other hand, during the data transmitting period, the distribution apparatuses 1a, 1b, 1c perform data transmitting operations to and from the ECUs 4a, 4a, ..., 4b, 4b, ..., 4c, 4c, ... instead of performing synchronizing operations between the distribution apparatuses 1a, 1b, 1c. The ECUs 4a, 4a, ..., 4b, 4b, ..., 4c, 4c, ... send data to the distribution apparatuses 1a, 1b, 1c and receive data being sent from the distribution apparatuses 1a, 1b, 1c.

The configuration with dividing timing described above can lead advantages that databases 11a, 11b, 11c of the distribution apparatuses 1a, 1b, 1c have been surely synchronized at the completed time of the synchronizing period.

However, during the synchronizing period in this case, data is not sent from the distribution apparatuses 1a, 1b, 1c to the ECUs 4a, 4a, ..., 4b, 4b, ..., 4c, 4c, .... Thus, delay corresponding to the synchronizing period occur in the data transmission between the ECUs 4a, 4a, ..., 4b, 4b, ..., 4c, 4c, ... connected with different communication lines 3a, 3b, 3c. In addition, data transmission from the ECUs 4a, 4a, ..., 4b, 4b, ..., 4c, 4c, ... to the distribution apparatuses 1a, 1b, 1c may be stopped until the following period in the case that the distribution apparatuses 1a, 1b, 1c fail to receive data from the ECUs 4a, 4a, ..., 4b, 4b, ..., 4c, 4c, ... due to any reason, because of the division of the synchronizing period and the data transmitting period. In such circumstances, further delay occur in the data transmission between the ECUs 4a, 4a, ..., 4b, 4b, ..., 4c, 4c, ... connected with different communication lines 3a, 3b, 3c.

In view of such circumstances, the communication system adapting for car of the embodiment 1 performs the synchronizing operation and the data transmitting operation in parallel, instead of dividing the synchronizing period and the data transmitting period as described above, although the synchronizing operation and the data transmitting operation are performed by periodical processing of the distribution apparatus 1a, 1b, 1c and the ECUs 4a, 4a, ..., 4b, 4b, ..., 4c, 4c, ....

Thus, the distribution apparatuses 1a, 1b, 1c that configure the communication system adapting for car of the embodiment 1 include for the synchronized databases 11a, 11b, 11c: receiving buffers 12a, 12b, 12c that store data sent from the ECUs 4a, 4a, ..., 4b, 4b, ..., 4c, 4c, ...; and sending buffers 13a, 13a, 13c that store data sent to the ECUs 4a, 4a, ..., 4b, 4b, ..., 4c, 4c, ..., as shown in FIG. 1.

Solid normal arrows shown in FIG. 1 represent data flows between the ECUs 4a, 4a, ..., 4b, 4b, ..., 4c, 4c, ... and the distribution apparatuses 1a, 1b, 1c. White wide arrows shown in FIG. 1 represent data flows for synchronization between the distribution apparatuses 1a, 1b, 1c. Black wide arrows in FIG. 1 represent data flows that the latest data received from the ECUs 4a, 4a, ..., 4b, 4b, ..., 4c, 4c, ... are copied from the receiving buffers 12a, 12b, 12c to databases 11a, 11b, 11c and data flows that synchronized data between the distribution apparatuses 1a, 1b, 1c are copied from the databases 11a, 11b, 11c to the sending buffers 13a, 13b, 13c.

The distribution apparatuses 1a, 1b, 1c perform, in parallel, the synchronizing operation between the distribution apparatuses 1a, 1b, 1c that is represented by the white wide arrows, the data receiving operation of receiving data sent from the ECUs 4a, 4a, ..., 4b, 4b, ..., 4c, 4c, ... that is represented by the solid normal arrows, and the data sending operation of sending read data from the distribution apparatuses 1a, 1b, 1c to the ECUs 4a, 4a, ..., 4b, 4b, ..., 4c, 4c, .... In addition, the distribution apparatuses 1a, 1b, 1c includes receiving buffers 12a, 12b, 12c and sending buffers 13a, 13b, 13c, for the databases 11a, 11b, 11c that are periodically synchronized. Thus, it is possible to prevent contents of the databases 11a, 11b, 11c from being changed from time to time during the synchronizing operation with using received data. In other words, it is possible to prevent the distribution apparatuses 1a, 1b, 1c from having stored data whose contents are different each other at a predetermined time. Therefore, it is possible to perform the synchronizing operation and the data transmitting operation in parallel, and possible to surely make a period when data having the same contents can be utilized.

As shown by the black wide arrows in FIG. 1, the distribution apparatuses 1a, 1b, he receive and store data being sent from the ECUs 4a, 4a, ..., 4b, 4b, ..., 4c, 4c, ... onto the receiving buffers 12a, 12b, 12c, and then copy the stored data onto the databases 11a, 11b, 11c. Therefore, the databases 11a, 11b, 11c are updated to reflect the latest data. The distribution apparatuses 1a, 1b, 1c can read out data from the databases 11a, 11b, 11c that are updated with the latest data and can transmit data in order to exchange data between the distribution apparatuses 1a, 1b, 1c. Thus, the distribution apparatuses 1a, 1b, 1c can synchronize contents of databases 11a, 11b, 11c with using the latest contents.

Further, the distribution apparatuses 1a, 1b, 1c copy data stored on the databases 11a, 11b, 11c onto the sending buffers 13a, 13b, 13c, as shown by the black wide arrows in FIG. 1. Therefore, it is possible to read out data from the databases 11a, 11b, 11c that are synchronized with using the latest contents, and possible to send read data to each ECU 4a, 4a, ..., 4b, 4b, ..., 4c, 4c, ....

Figure 2:
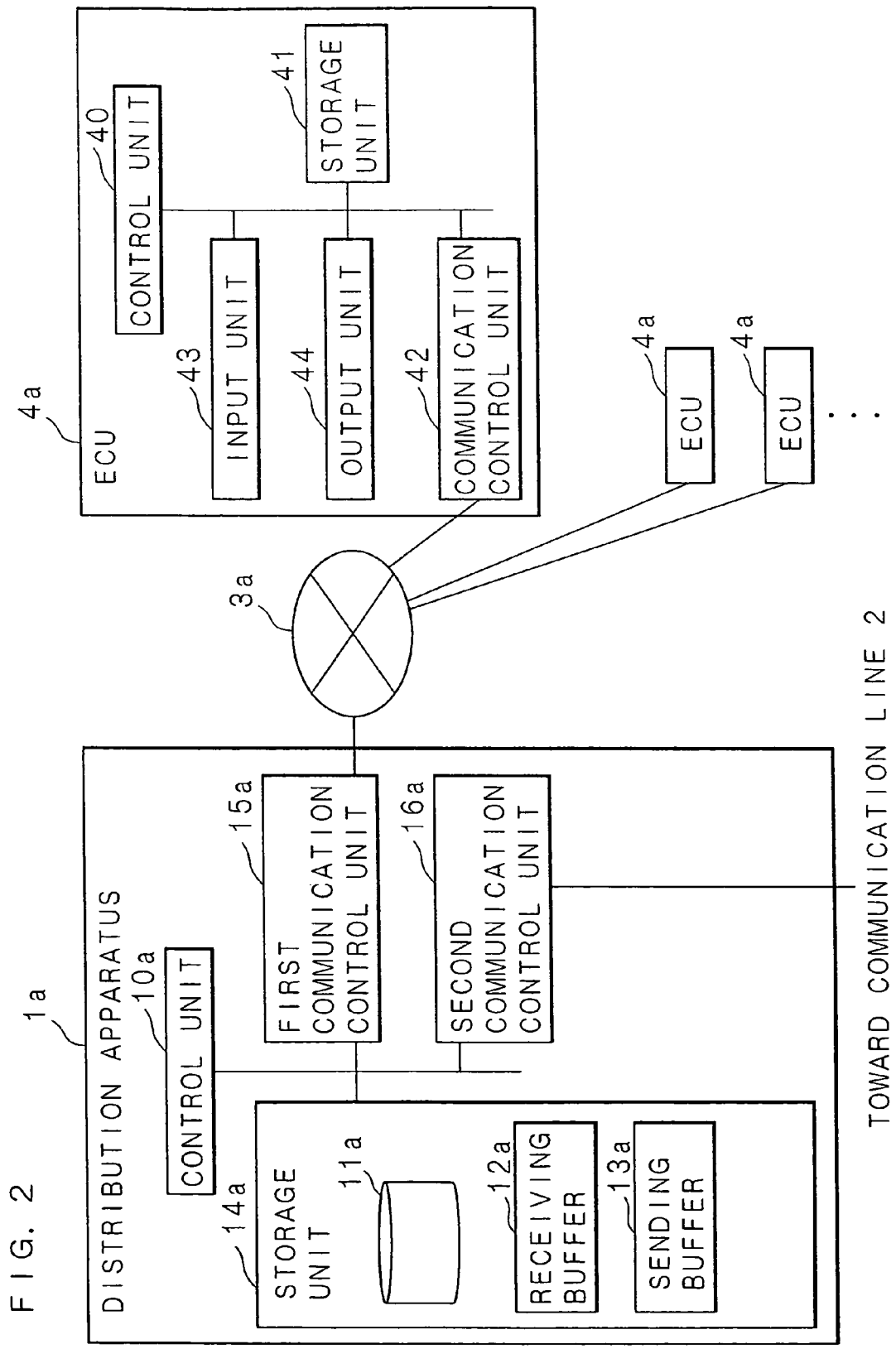
FIG. 2 is a block diagram showing inner components of an ECU and a distribution apparatus included in the communication system adapting for car of the embodiment 1.

FIG. 2 is a block diagram showing inner components of the ECU 4a and the distribution apparatus 1a included in the communication system adapting for car of the embodiment 1. The other distribution apparatuses 1b, 1c have similar components to those of the distribution apparatus 1a, and the other ECUs 4b, 4c have similar components to those of the ECU 4a. Thus, configurations of the other distribution apparatuses 1b, 1c and the other ECUs 4b, 4c will not be described in detail.

The distribution apparatus 1a includes: a control unit 10a that controls each component described bellow; storage unit 14a utilizing volatile memory; first communication control unit 15a connected to the communication line 3a; and a second communication control unit 16a connected to the communication line 2. The other distribution apparatuses 1b, 1c also include similar internal components to those of the distribution apparatus 1a. Thus, it will not be described about internal components of the other distribution apparatuses 1b, 1c.

The control unit 10a is supplied with electric power from an electric power supply (not shown), such as an alternator or battery adapting for car, reads out a control program stored in non-volatile inner memory (not shown), and executes the control program in order to control each component.

The storage unit 14a includes a memory region of a database 11a for storing data received from the ECUs 4a, 4a, ... by the control unit 10a. As a message being received from the ECUs 4a, 4a, ... includes several types of data such as "wheel speed", "steering angle", and "oil temperature", the control unit 10a reads out a specific measured values, computed values or control values for each type of data from the received message, and stores the read values on the database 11a.

The first communication control unit 15a implements data transmission between the distribution apparatus 1a and the ECUs 4a, 4a, ... connected via the communication line 3a. The control unit 10a controls first communication control unit 15a to receive data from the ECUs 4a, 4a, ..., and to send data to the ECUs 4a, 4a, ....

The second communication control unit 16a implements data transmission between the distribution apparatus 1a and the other distribution apparatuses 1b, 1c connected via the communication line 2. The control unit 10a controls second communication control unit 16a to send data to the other distribution apparatuses 1b, 1c, and to receive data from the other distribution apparatuses 1b, 1c.

The ECU 4a includes: a control unit 40 that controls each component described bellow; storage unit 41 utilizing non-volatile memory; communication control unit 42 connected to the communication line 3a; input unit 43 that inputs a signal from a sensor (not shown); and an output unit 44 that outputs a control signal to an object device to be controlled (not shown). Anyway, the input unit 43 or the output unit 44 may be alternatively provided to one or more ECUs among the ECUs 4a, 4a, ..., 4b, 4b, ..., 4c, 4c, ....

The control unit 40 of the ECU 4a is supplied with electric power from an electric power supply (not shown), such as an alternator or battery adapting for car, detects a signal representing measured values provided from a sensor (not shown)

connected to the ECU 4a through the input unit 43, and sends a control signal through the output unit 44 to a controlled object device connected with the ECU 4a.

The storage unit 41 temporally stores several information generated during the operation of the control unit 40, and measured values represented by a signal being input from a sensor.

The communication control unit 42 has a network control unit chip and implements communicating with the communication line 3a. The control unit 40 of the ECU 4a detects a signal provided from a sensor (not shown) every predetermined interval, e.g., 1 millisecond, and then sends data including physical values represented by the detected signal, through the communication control unit 42. Further, the control unit 40 of the ECU 4a receives data being sent from the distribution apparatus 1a through the communication control unit 42.

It will be described in detail about data transmitting operation that is performed between the distribution apparatuses 1a, 1b, 1c and the ECUs 4a, 4a, . . . , 4b, 4b, . . . , 4c, 4c, . . . in the communication system adapting for car described above, and about synchronizing operation that is for synchronizing the contents of the databases 11a, 11b, 11c.

Figure 3:
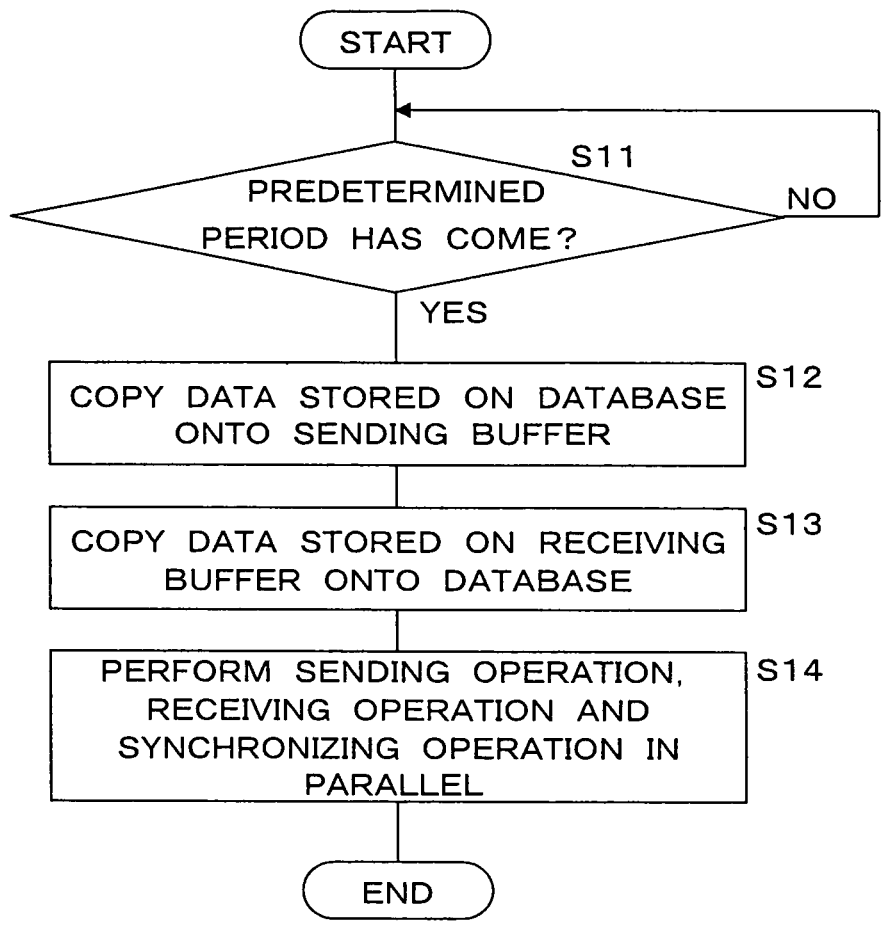
FIG. 3 is a flowchart showing one example of a procedure for transmitting and synchronizing data performed by a control unit of the distribution apparatus of the embodiment 1.

FIG. 3 is a flowchart showing one example of a procedure for data transmitting operation and synchronizing operation performed by the control unit 10a of the distribution 1a of the embodiment 1. Operations performed by the control units 10b, 10c of the distribution apparatuses 1b, 1c have similar procedures to those of the control unit 10a of the distribution apparatus 1a. Thus, those procedures of the control units 10b, 10c will not be described in detail.

The control unit 10a of the distribution apparatus 1a determines whether a predetermined period for the data transmitting operation and the synchronizing operation has come or not (step S11). When determining that the predetermined period has not come (S11: NO), the control unit 10a returns the procedure to the step S11 and waits until determining that the predetermined period has come.

When determining that the predetermined period has come (S11: YES), the control unit 10a copies data stored on the database 11a onto the sending buffer 13a (step S12). At the step S12, the control unit 10a may copy all data stored on the database 11a onto the sending buffer 13a. Alternatively, the control unit 10a may copy only predetermined data that are previously set as necessary data for the ECUs 4a, 4a, . . . connected via the communication line 3a at the step S12, in the case that the sending buffer 13a has small capacity.

The control unit 10a then copies data stored on the receiving buffer 12a onto the database 11a (step S13). Further, the control unit 10a performs the receiving operation that receives data sent from the ECUs 4a, 4a, . . . , the sending operation that sends data to the ECUs 4a, 4a, . . . , and the synchronizing operation in parallel (step S14), and completes the procedure.

In the procedure shown by the flowchart in FIG. 3, the step S13 is explained to be performed after the step S12. However, the step S13 may be performed before the step S12.

Figure 4:
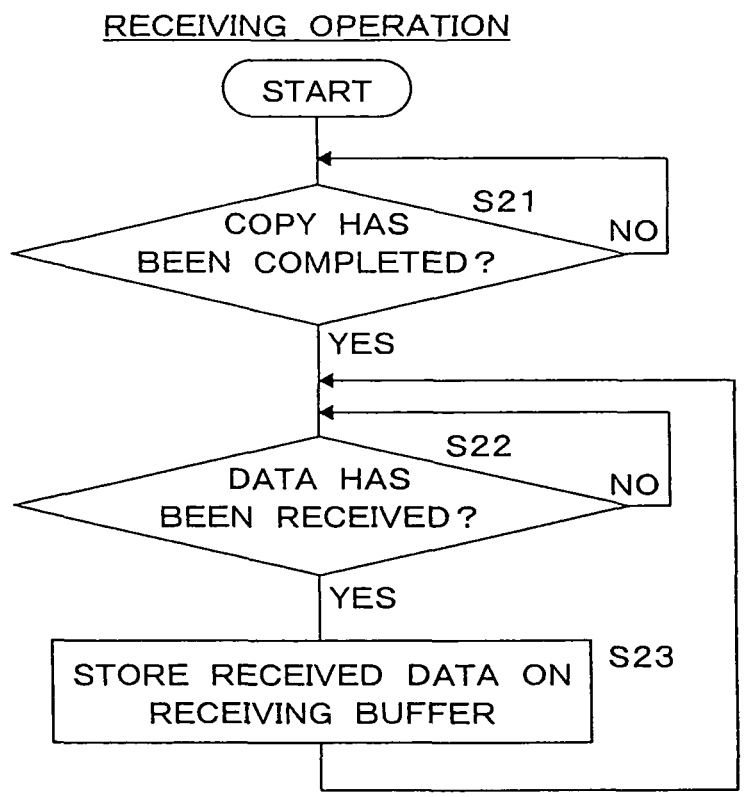
FIG. 4 is a flowchart showing a procedure for receiving data from the ECU with using the control unit of the distribution apparatus of the embodiment 1.

FIG. 4 is a flowchart showing a procedure for receiving data from the ECUs 4a, 4a, . . . with using the control unit 10a of the distribution apparatus 1a of the embodiment 1. The data receiving operation shown by the flowchart in FIG. 4 corresponds to one of the operations performed in parallel at the step S14 shown in the flowchart of FIG. 3.

The control unit 10a of the distribution apparatus 1a determines whether the copy of data stored on the receiving buffer 12a onto the database 11a has been completed after the predetermined period has come or not (step S 21). Regarding the completion of data copy from the receiving buffer 12a onto the database 11a, the determination can be made with allowing the control unit 10a to notice the completion of data copy to itself. Alternatively, the determination can be made with storing a flag representing the completion of data copy on the storage unit 14a, or the like.

When determining that the copy of data stored on the receiving buffer 12a onto the database 11a has not been completed (S21: NO), the control unit 10a returns the procedure to the step S21 and waits until determining that the copy of data stored on the receiving buffer 12a onto the database 11a has been completed. When determining that the copy of data stored on the receiving buffer 12a onto the database 11a has been completed (S21: YES), the control unit 10a determines whether data has been received from any of the ECUs 4a, 4a, . . . , or not (step S22).

When determining that data has not been received (S22: NO), the control unit 10a returns the procedure to the step S22 and waits until determining that the data has been received. When determining that data has been received (S22: YES), the control unit 10a stores received data on the receiving buffer 12a (step S23), returns the procedure to the step S22, and waits until determining that another data has been received.

The control unit 10a repeats the step S22 and the step S23 until determining that the predetermined period has come, at the step S11 in the procedure shown by the flowchart of FIG. 3.

Figure 5:
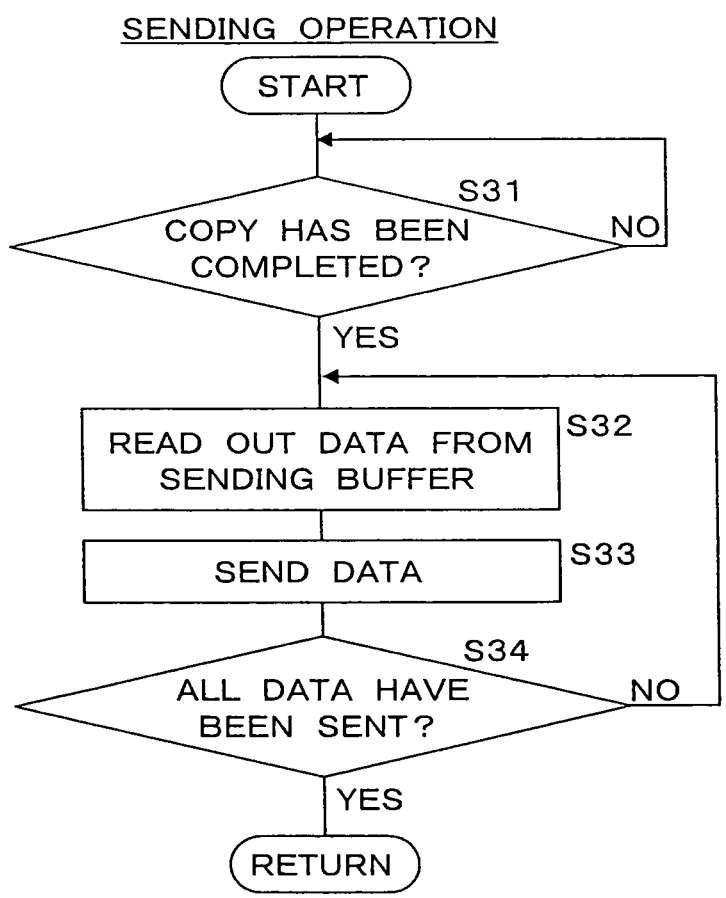
FIG. 5 is a flowchart showing a procedure for sending data to the ECU with using the control unit of the distribution apparatus of the embodiment 1.

FIG. 5 is a flowchart showing a procedure for sending data to the ECUs 4a, 4a, . . . with using the control unit 10a of the distribution apparatus 1a of the embodiment 1. The data sending operation shown by the flowchart of FIG. 5 corresponds to one of the operations performed in parallel at the step S14 shown in the flowchart of FIG. 3.

The control unit 10a of the distribution apparatus 1a determines whether the copy of data stored on the database 11a onto the sending buffer 13a has been completed after the predetermined period has come or not (step S 31). Regarding the completion of data copy from the database 11a onto the sending buffer 13a, the determination can be made with allowing the control unit 10a to notice the completion of data copy to itself. Alternatively, the determination can be made with storing a flag representing the completion of data copy on the storage unit 14a, or the like.

When determining that the copy of data stored on the database 11a onto the sending buffer 13a has not been completed (S31: NO), the control unit 10a returns the procedure to the step S31, and waits until determining that the copy of data stored on the database 11a onto the sending buffer 13a has been completed. When determining that the copy of data stored on the database 11a onto the sending buffer 13a has been completed (S31: YES), the control unit 10a reads out data from the sending buffer 13a (step S32), and sends the read data to the ECUs 4a, 4a, . . . that require the read data (step S33).

The control unit 10a determines whether all data that should be sent to the predetermined ECUs 4a, 4a, . . . have been sent or not (step S34). When determining that all data which should be sent to the predetermined ECUs 4a, 4a, . . . have not been sent (S34: NO), the control unit 10a returns the procedure to the step S32, and repeats the step S32 and the step S33 until determining that all data which should be sent to the predetermined ECUs 4a, 4a, . . . have been sent.

When determining that all data which should be sent to the predetermined ECUs 4a, 4a, . . . have been sent (S34: YES), the control unit 10a completes the data sending operation, returns to the procedure shown by the flowchart in FIG. 3, and waits until the following predetermined period has come.

FIG. 6 is a flowchart showing a procedure for synchronizing contents of database 11a with the other distribution apparatuses 1b, 1c with using the control unit 10a of the distribution apparatus 1a of the embodiment 1. The synchronizing operation shown by the flowchart of FIG. 6 corresponds to one of the operations performed in parallel at the step S14 shown in the flowchart of FIG. 3.

The control unit 10a of the distribution apparatus 1a determines whether both the copy of data stored on the database 11a onto the sending buffer 13a and the copy of data stored on the receiving buffer 12a onto the database 11a have been completed after the predetermined period has come or not (step S41).

When deterthining that both the copies of data have not been completed (S41: NO), the control unit 10a returns the procedure to the step S41, and waits until determining that both the copies of data have been completed. When determining both the copies of data have been completed (S41: YES), the control unit 10a reads out data from the database 11a (step S42) and sends the read data to the other distribution apparatuses 1b, 1c (step S43).

The control unit 10a receives data being sent from the other distribution apparatuses 1b, 1c (step S44), stores the received data on the database 11a (step S45), completes the synchronizing operation during the present predetermined period, returns to the procedure shown by the flowchart of FIG. 3, and waits until the following predetermined period has come.

The control units 10a, 10b, 10c of the distribution apparatuses 1a, 1b, 1c spontaneously perform the procedures shown by the flowcharts of FIG. 4, FIG. 5 and FIG. 6 in parallel, with using databases 11a, 11b, 11c, receiving buffers 12a, 12b, 12c, and the sending buffers 13a, 13b, 13c. Therefore, it is possible to reduce data sending delay due to performing the synchronizing operation.

Figure 7A:
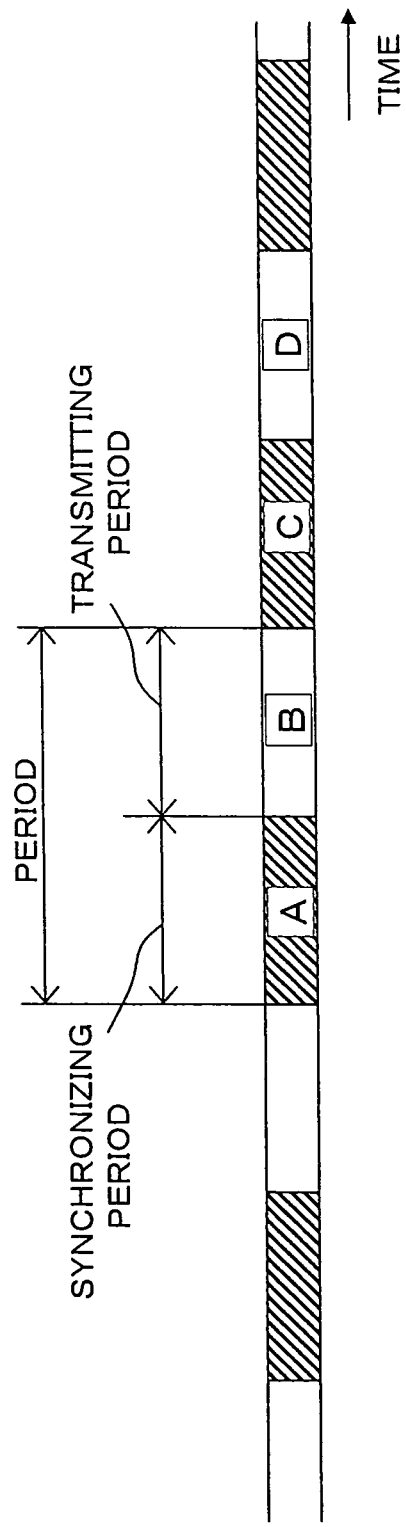
FIG. 7A and FIG. 7B are schematic time charts showing operations performed by the control unit of the distribution apparatus of the embodiment 1 with respect to time passage.
Figure 7B:
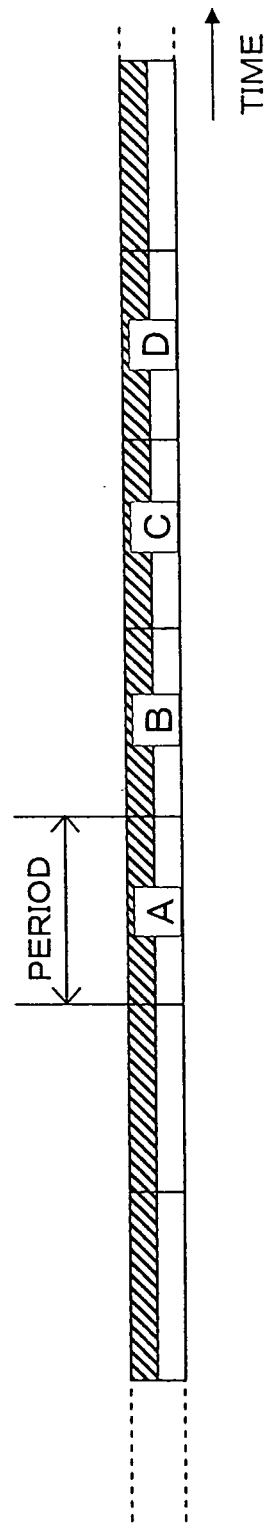

FIG. 7A and FIG. 7B are schematic time charts showing operations performed by the control units 10a, 10b, 10c of the distribution apparatuses 1a, 1b, 1c of the embodiment 1 with respect to time passage. FIG. 7A shows a time chart in the case of performing the synchronizing operation and the data transmitting operation with separating the timing of the synchronizing period and the timing of the data transmitting period, for comparison purpose to the present invention. FIG. 7B shows a time chart according to operations performed by the control units 10a, 10b, 10c of the distribution apparatuses 1a, 1b, 1c of the embodiment 1. In the FIG. 7A and the FIG. 7B, the horizontal axis represents time passage, and each rectangle represents a separated period.

In the case that the timing of the synchronizing period can be separated from the timing of the data transmitting period as shown in FIG. 7A, even when data are sent from the ECUs 4a, 4a, . . . , 4b, 4b, . . . , 4c, 4c, . . . during the period A, the receiving operation is performed during the period B. Then, the synchronizing operation is performed to reflect the sent data during the period C. Thus, the data being sent even during the period A are sent to each ECU 4a, 4a, . . . , 4b, 4b, 4c, 4c, . . . during the period D which is after the completion of the synchronizing operation.

On the other hand, in the case shown in FIG. 7B, when data are sent from the ECU 4b during the period A, the synchronizing operation between the distribution apparatuses 1a, 1b, 1c can be performed to reflect the sent data during the period B, because the distribution apparatuses 1a, 1b, 1c perform the synchronizing operation and the data transmitting operation in parallel. Because of the synchronizing operation, the data being sent from the ECU 4b during the period A can be stored on the database 11a of the distribution apparatus 1a, and be copied from the database 11a onto the sending buffer 13a during the period C. Therefore, the data being sent from the ECU 4b to the distribution apparatus 1b during the period A are sent from the distribution apparatus 1a to each ECU 4a, 4a, . . . during the period C. The data being sent from the ECU 4a to the distribution apparatus 1a during the period A are also copied onto the sending buffer 13a during the period C after being copied from the receiving buffer 12a to the database 11a. Therefore, even in the case that data are sent from the ECUs 4a, 4a, . . . , 4b, 4b, . . . , 4c, 4c, . . . which are connected to different communication lines 3a, 3b, 3c, all the plural data being received during the same period A can be sent to each ECU 4a, 4a, . . . , 4b, 4b, . . . , 4c, 4c, . . . during the same period C.

As described above, the distribution apparatuses 1a, 1b, 1c include receiving buffers 12a, 12b, 12c and the sending buffers 13a, 13b, 13c and utilize them. Therefore, it is possible to perform an operation of receiving and storing data sent from the ECUs 4a, 4a, . . . , 4b, 4b, . . . , 4c, 4c, . . . , operation of sending data to each ECU 4a, 4a, . . . , 4b, 4b, . . . , 4c, 4c, . . . , and an operation of synchronizing contents of databases 11a, 11b, 11c, in parallel. Furthermore, it is possible to reduce data sending delay due to performing a synchronizing operation between the distribution apparatuses 1a, 1b, 1c.

(Embodiment 2)

The distribution apparatuses 1a, 1b, 1c of the embodiment 1 includes receiving buffers 12a, 12b, 12c and sending buffers 13a, 13b, 13c with respect to the databases 11a, 11b, 11c, respectively. On the other hand, each of the distribution apparatuses 1a, 1b, 1c of an embodiment 2 includes two databases, for example.

FIG. 8 is a block diagram showing components of a communication system adapting for car of the embodiment 2. Although having similar components to the communication system adapting for car of the embodiment 1, the communication system adapting for car of the embodiment 2 includes distribution apparatuses 1a, 1b, 1c each of which has two memory regions utilized as database. Thus, configurations that are the same as those of the embodiment 1 are given the identical numerals to the embodiment 1 and, accordingly, will not be described in detail.

Each of the distribution apparatuses 1a, 1b, 1c of the embodiment 2 includes a database 11a, 11b, 11c and a database 17a, 17b, 17c in the storage unit 14a, 14b, 14c. Not only the database 11a, 11b, 11c, but also the database 17a, 17b, 17c is utilized as a storing means for receiving and storing data from the ECUs 4a, 4a, . . . , 4b, 4b, 4c, 4c, . . . and for synchronizing between the distribution apparatuses 1a, 1b, 1c, or as a storing means for reading out data to be sent to the ECUs 4a, 4a, . . . , 4b, 4b, . . . , 4c, 4c, . . . . These two types of function about storing means are alternated each other every predetermined period.

Solid normal arrows and solid white wide arrows in FIG. 8 represent data flows between the distribution apparatuses 1a, 1b, 1c and the ECUs 4a, 4a, . . . , 4b, 4b, . . . , 4c, 4c, . . . during a predetermined period. On the other hand, broken normal arrows and broken white wide arrows in FIG. 8 represent data flows between the distribution apparatuses 1a, 1b, he and the ECUs 4a, 4a, . . . , 4b, 4b, . . . , 4c, 4c, . . . during the following predetermined period.

As shown by the solid normal arrows and solid white wide arrows in FIG. 8, for example, the distribution apparatus 1a stores data received from the ECUs 4a, 4a, . . . during the predetermined period on the database 11a, and synchronizes contents of data stored on the database 11a with the databases 11b, 11c of other distribution apparatuses 1b, 1c. Further, the distribution apparatus 1a reads out data stored on the database 17a and distributes these data to the ECUs 4a, 4a, . . . during the present predetermined period.

Then, the distribution apparatus 1a alternates the database 11a and the database 17a during the following predetermined period. As shown by the broken normal arrows and broken white wide arrows in FIG. 8, the distribution apparatus 1a stores data received from the ECUs 4a, 4a, . . . on the database 17a, and synchronizes contents of data stored on the database 17a with the databases 17b, 17c of other distribution apparatuses 1b, 1c, during the following predetermined period. Further, the distribution apparatus 1a reads out data stored on the database 11a that is synchronized with the databases 11b, 11c of other distribution apparatuses 1b, 1c during the predetermined period and distributes these data to the ECUs 4a, 4a, . . . during the following predetermined period.

The distribution apparatuses 1a, 1b, 1c perform three operations in parallel: a receiving operation of receiving data sent from the ECUs 4a, 4a, . . . , 4b, 4b, . . . , 4c, 4c, . . . shown by the solid normal arrows and solid white wide arrows in FIG. 8 and storing these data on the databases 11a, 11b, 11c; a synchronizing operation of synchronizing databases 11a, 11b, 11c of the distribution apparatuses 1a, 1b, 1c; and a sending operation of reading out data from the databases 17a, 17b, 17c and sending these data to the ECUs 4a, 4a, . . . , 4b, 4b, . . . , 4c, 4c, . . . .

FIG. 9 is a block diagram showing inner components of the ECU 4a and the distribution apparatus 1a included in the communication system adapting for car of the embodiment 2. As described above, the distribution apparatuses 1a, 1b, 1c of the embodiment 2 include storage units 14a, 14b, 14c that are configured differently from those of the embodiment 1. The distribution apparatuses 1b, 1c are configured similarly to the distribution apparatus 1a and, accordingly, will not be described in detail. The ECUs 4a, 4a, . . . , 4b, 4b, . . . , 4c, 4c, . . . of the embodiment 2 are configured similarly to the ECUs 4a, 4a, . . . , 4b, 4b, . . . , 4c, 4c, . . . of the embodiment 1 and, accordingly, will not be described in detail.

The storage unit 14a of the distribution apparatus 1a arranges memory regions for the database 11a and for the database 17a. Although performing operations in accordance with a predetermined period similarly to the embodiment 1, the control unit 10a of the distribution apparatus 1a in the embodiment 2 alternates the database 11a and the database 17a every predetermined period.

Figure 10:
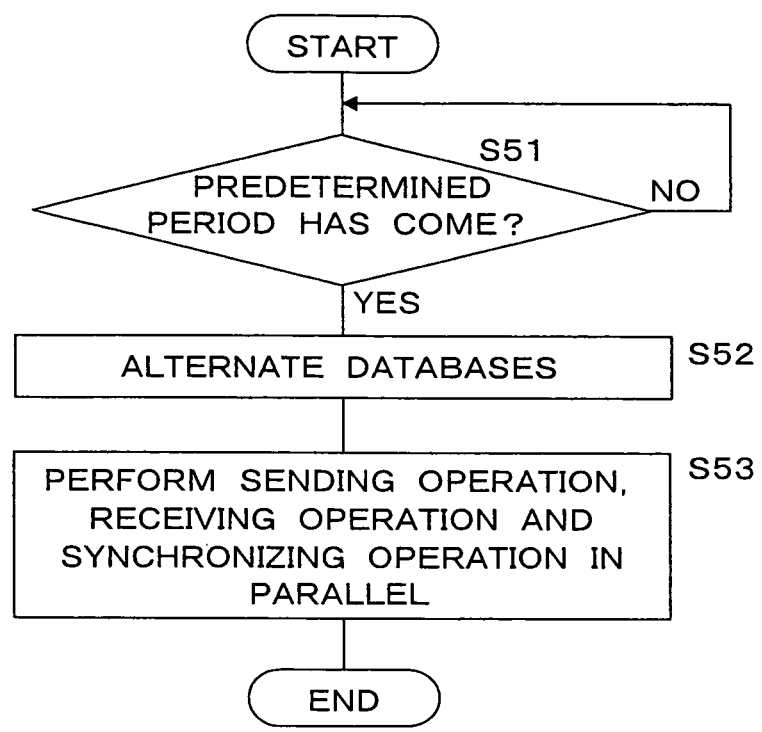
FIG. 10 is a flowchart showing one example of a procedure for transmitting and synchronizing data performed by a control unit of the distribution apparatus of the embodiment 2.

FIG. 10 is a flowchart showing one example of a procedure for transmitting and synchronizing data performed by the control unit 10a of the distribution apparatus 1a of the embodiment 2. Operations performed by the control units 10b, 10c of the distribution apparatuses 1b, 1c are similar to those of the control unit 10a of the distribution apparatus 1a and, accordingly, will not be described in detail.

The control unit 10a of the distribution apparatus 1a determines whether a predetermined period for the data transmitting operation and the synchronizing operation has come or not (step S51). When determining that the predetermined period has not come (S51: NO), the control unit 10a returns the procedure to the step S51, and waits until determining that the predetermined period has come.

When determining that the predetermined period has come (S51: YES), the control unit 10a alternates the database 11a and the database 17a (step S52).

In the case that the control unit 10a during previous period utilizes the database 11a for storing data received from the ECUs 4a, 4a, . . . and for synchronizing at the step S52, the control unit 10a alternates the database 11a and the database 17a during the present predetermined period, utilizes the database 11a for reading out data to be sent to the ECUs 4a, 4a, . . . , and utilizes the database 17a for synchronizing. On the other hand, in the case that the control unit 10a during previous period utilizes the database 17a for storing data received from the ECUs 4a, 4a, . . . and for synchronizing, the control unit 10a alternates the database 11a and the database 17a during the present predetermined period, utilizes the database 17a for reading out data to be sent to the ECUs 4a, 4a, . . . , and utilizes the database 11a for synchronizing.

Specifically, the control unit 10a switches an address for reading out data to be sent to the ECUs 4a, 4a, . . . and an address for storing data received from the ECUs 4a, 4a, . . . and for synchronizing. Thus, the control unit 10a can perform the receiving operation, sending operation and the synchronizing operation, without being conscious which database among the database 11a and database 17a should store data and should be utilized for reading out data.

The control unit 10a performs three operations in parallel: the receiving operation of receiving data from the ECUs 4a, 4a, . . . and storing these data on the database 11a or the database 17a; the sending operation of sending to the ECUs 4a, 4a, . . . data stored on the database 17a or the database 11a, and the synchronizing operation of synchronizing the database 11a (step S53). Then, the control unit 10a completes the procedure.

Figure 11:
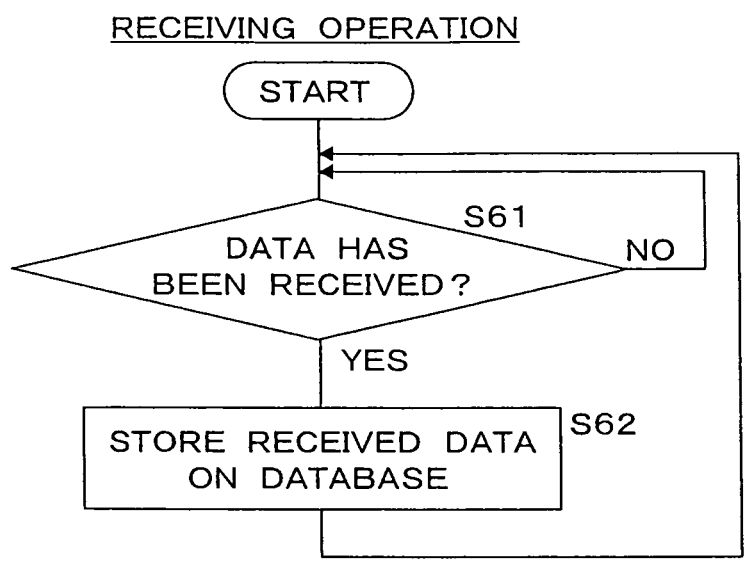
FIG. 11 is a flowchart showing a procedure for receiving data from an ECU with using the control unit of the distribution apparatus of the embodiment 2.

FIG. 11 is a flowchart showing a procedure for receiving data from the ECUs 4a, 4a, . . . with using the control unit 10a of the distribution apparatus 1a of the embodiment 2. The receiving operation shown by the flowchart of FIG. 11 is performed in parallel with the step S53 shown in the flowchart of FIG. 10.

The control unit 10a of the distribution apparatus 1a determines whether data has been received from any ECU 4a, 4a, . . . (step S61).

When determining that data has not been received (S61: NO), the control unit 10a returns the procedure to the step S61 and waits until determining that data has been received. When determining that data has been received (S61: YES), the control unit 10a stores received data on the switched database 11a or the database 17a (step S62), returns the procedure to the step S61, and waits until determining that another data has been received.

The control unit 10a repeats the step S61 and the step S62 until determining that the following period has come at the step S51 shown in the flowchart: of FIG. 10.

Figure 12:
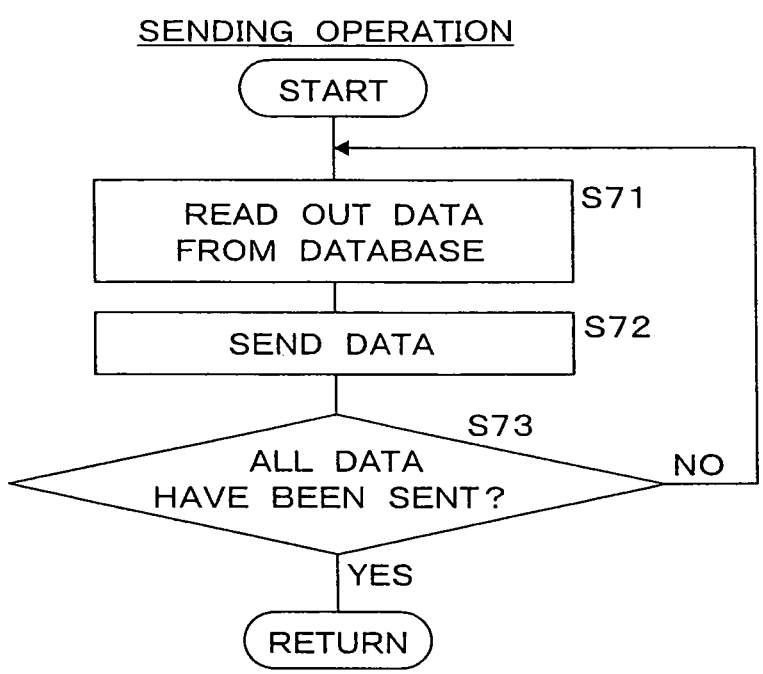
FIG. 12 is a flowchart showing a procedure for sending data to the ECU with using the control unit of the distribution apparatus of the embodiment 2.

FIG. 12 is a flowchart showing a procedure for sending data to the ECUs 4a, 4a, . . . with using the control unit 10a of the distribution apparatus 1a of the embodiment 2. The sending operation shown by the flowchart of FIG. 12 is performed in parallel with the step S53 shown in the flowchart of FIG. 10.

The control unit 10a of the distribution apparatus 1a reads out data from the switched database 11a or the database 17a (step S71), and sends the read data to the ECUs 4a, 4a, . . . that require the read data (step S72).

The control unit 10a determines whether all data have been sent or not that should be sent to previously set ECUs 4a, 4a, . . . (step S73). When determining that all data have not been sent (S73: NO), the control unit 10a returns the procedure to the step S71, and repeats the step S71 and the step S72 until determining that all data have been sent.

When determining that all data have been sent (S73: YES), the control unit 10a completes the sending operation, returns to the procedure shown by the flowchart of FIG. 10, and waits until the following predetermined period has come.

Figure 13:
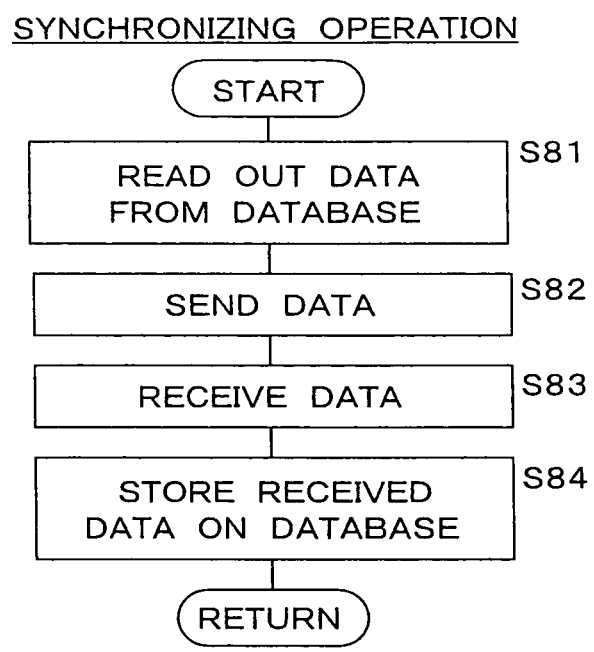
FIG. 13 is a flowchart showing a procedure for synchronizing contents of database with another distribution apparatus with using the control unit of the distribution apparatus of the embodiment 2.

FIG. 13 is a flowchart showing a procedure for synchronizing contents of database 11a with other distribution apparatuses 1b, 1c with using the control unit 10a of the distribution apparatus 1a of the embodiment 2. The synchronizing operation shown by the flowchart of FIG. 13 is performed in parallel with the step S53 shown in the flowchart of FIG. 10.

The control unit 10a of the distribution apparatus 1a reads out data from the switched database 11a or the database 17a (step S81), and send the read data to other distribution apparatuses 1b, 1c (step S82).

The control unit 10a receives data being sent from other distribution apparatuses 1b, 1c (step S83), and stores received data on the switched database 11a or the database 17a (step S84). Then, the control unit 10a completes the synchronizing operation during present period, returns to the procedure shown by the flowchart of FIG. 10, and waits until the following predetermined period has come.

As described above, the control unit 10a, 10b, 10c of the distribution apparatuses 1a, 1b, 1c can perform the procedures shown by the flowcharts of FIGS. 11 to 13 in parallel, with utilizing both the databases 11a, 11b, 11c and the databases 17a, 17b, 17c. Therefore, it is possible to reduce data sending delay due to performing the synchronizing operation.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A communication system with a plurality of distribution apparatuses each of which is connected to a group of corresponding electronic control units, wherein
each of the distribution apparatuses comprises:
a storing unit that stores multiple types of data;
a synchronizing unit that synchronizes the data on the storing unit with data in a storing unit of another distribution apparatus when determining that a predetermined period has started;
a receiving unit that receives different types of data transmitted periodically from a corresponding electronic control unit in the group of corresponding electronic control units; and
a sending unit that sends data among the multiple types of data stored in the storing unit to the corresponding electronic control unit, wherein
the receiving unit stores received data on the storing unit whenever receiving data during the predetermined period, and
the predetermined period is equal to or shorter than a period of data transmitting from the corresponding electronic control unit mounted in a car.

2. The communication system according to claim 1, wherein
the storing unit comprises:
a first storing section that stores the multiple types of data received by the receiving unit; and
a second storing section that stores data to be sent by the sending unit and data to be utilized by the synchronizing unit for synchronizing, and
each of the distribution apparatuses further comprises:
an alternating unit that alternates the first storing section and the second storing section, when the predetermined period starts.

3. The communication system according to claim 1, wherein
reception of data and storing of the received data by the receiving unit are performed in parallel with sending data the sending unit, and with synchronization of the data by the synchronizing unit.

4. The communication system according to claim 3, wherein
the storing unit comprises:
a first storing section that stores data received by the receiving unit;
a second storing section that stores data to be sent by the sending unit; and
a third storing section that stores data to be utilized by the synchronizing unit for synchronizing.

5. The communication system according to claim 4, wherein
each of the distribution apparatuses further comprises:
a copying unit that copies data stored in the first storing section periodically onto the third storing section; and
a changing unit that changes data stored in the second storing section periodically with using data stored in the third storing section, wherein
synchronization by the synchronizing unit is performed after copying by the copying unit in each period; and
change by the changing unit is performed after synchronization by the synchronizing unit in each period.

6. The communication system according to claim 1, wherein the receiving unit receives the different types of data including numerical information of several physical quantities associated with communication in a car.

7. A communication method, performed by each of a plurality of distribution apparatuses each of which comprises a storing unit storing multiple types of data and is connected to a group of corresponding electronic control units, respectively, comprising the steps of:
synchronizing the data in the storing unit with data in a storing unit of another distribution apparatus when determining that a predetermined period has started;
receiving different types of data transmitted periodically from a corresponding electronic control unit in the group of corresponding electronic control units during the predetermined period;
storing the different types of data in the storing unit whenever receiving data during the predetermined period; and
sending data among the multiple types of data stored in the storing unit to the corresponding electronic control unit during the predetermined period,
wherein the predetermined period is equal to or shorter than a period of data transmitting from the corresponding electronic control unit mounted in a car.

8. The communication method according to claim 7, further comprising the steps performed by each distribution apparatus of:
storing received data in a first storing section of the storing unit;
storing data to be sent and data to be utilized for synchronizing in a second storing section of the storing unit; and
alternating the first storing section and the second storing section when the predetermined period starts.

9. The communication method according to claim 7, wherein reception of data is performed in parallel with sending data, and with synchronization of the data stored in the storing units when the predetermined period starts.

10. The communication method according to claim 7, further comprising the steps of:
storing received data during the predetermined period in a first storing section of the storing unit;
storing data to be sent during the storing during predetermined period in a second storing section of the storing unit; and storing data to be utilized for synchronizing during the predetermined period in a third storing section of own storing unit.

11. The communication method according to claim 10, further comprising the steps performed by each distribution apparatus of:
  copying data stored in the first storing section onto the third storing section, periodically; and
  changing data stored in the second storing section with using data stored in the third storing section, periodically; wherein
  synchronizing of the data stored in the storing units is performed after copying data during the predetermined period; and
  changing of data is performed after synchronization of the data stored in the storing units during the predetermined period.

* * * * *